United States Patent
Silver et al.

(10) Patent No.: US 12,393,625 B2
(45) Date of Patent: *Aug. 19, 2025

(54) SYSTEMS AND METHODS FOR REAL-TIME DATA PROCESSING OF UNSTRUCTURED DATA

(71) Applicant: Citibank, N.A., New York, NY (US)

(72) Inventors: Miriam Silver, Tel Aviv (IL); Nimrod Barak, New York, NY (US); Prag Sharma, New York, NY (US); Avi Gefen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,711

(22) Filed: May 17, 2024

(65) Prior Publication Data

US 2025/0190471 A1 Jun. 12, 2025

Related U.S. Application Data

(63) Continuation of application No. 18/531,660, filed on Dec. 6, 2023, now Pat. No. 11,989,217.

(51) Int. Cl.
*G06F 16/334* (2025.01)
*G06F 16/31* (2019.01)
*G06F 40/40* (2020.01)

(52) U.S. Cl.
CPC ......... *G06F 16/3347* (2019.01); *G06F 16/31* (2019.01); *G06F 40/40* (2020.01)

(58) Field of Classification Search
CPC ....... G06F 16/3347; G06F 16/31; G06F 40/40
See application file for complete search history.

(56) References Cited

U.S. PATENT DOCUMENTS

| | | | |
|---|---|---|---|
| 2010/0223276 A1* | 9/2010 | Al-Shameri | G06V 20/13 707/769 |
| 2015/0019537 A1* | 1/2015 | Neels | G06F 16/9535 707/722 |
| 2022/0036002 A1* | 2/2022 | Sriharsha | G06N 3/08 |
| 2022/0036177 A1* | 2/2022 | Sriharsha | G06F 16/2379 |

* cited by examiner

*Primary Examiner* — Fan S Tsang
*Assistant Examiner* — David Siegel
(74) *Attorney, Agent, or Firm* — Foley & Lardner LLP

(57) ABSTRACT

Systems and methods for novel approaches and/or improvements to real-time data processing of unstructured data. In particular, the systems and methods describe real-time data processing of unstructured data without interstitial standardization. For example, the systems and methods describe real-time data processing of unstructured data in which both the input and the output to the data processing pipeline is unstructured data.

20 Claims, 5 Drawing Sheets

SYSTEMS AND METHODS FOR REAL-TIME DATA PROCESSING OF UNSTRUCTURED DATA

CROSS-REFERENCE TO RELATED APPLICATION(S)

This application is a continuation of U.S. patent application Ser. No. 18/531,660, filed Dec. 6, 2023. The content of the foregoing application is incorporated herein in its entirety by reference.

BACKGROUND

Structured data refers to organized and well-formatted information that follows a predefined data model or schema. In structured data, the elements or fields within the data are clearly defined, and there is a high level of consistency in terms of format. This type of data is typically easy to search, query, and analyze. Structured data contrasts with unstructured and semi-structured data. Unstructured data lacks a predefined data model and is often in the form of text, images, audio, and video. Semi-structured data has some level of organization, but it may not conform to a rigid schema, often represented in formats like XML, JSON, or key-value pairs. Structured data is well-suited for traditional relational databases and is essential for many data-driven applications and analytical processes.

Unstructured data is challenging to process for several reasons, primarily due to its lack of a predefined data model or structure. For example, unstructured data does not adhere to a fixed schema, making it difficult to organize and interpret using traditional database systems designed for structured data. Additionally, unstructured data can take on various forms, including text, images, audio, video, and more. Each data type requires different processing techniques, tools, and algorithms. Unstructured data also often comes in large volumes, making it challenging to store, manage, and process efficiently. This requires scalable and distributed processing systems. Because of this, unstructured data poses unique technical challenges for practical applications requiring real-time processing, analysis, and/or retrieval.

Because of this, many practical applications that require real-time processing, analysis, and/or retrieval attempt to format unstructured data into standardized, structured data during data intake. The application may then attempt to perform the real-time processing, analysis, and/or retrieval on the newly standardized, structured data. However, this intermediary processing raises additional technical challenges because not only is standardizing various types of content difficult, but the standardization process risks stripping attributes of the content that are used for the processing, analysis, and/or retrieval.

SUMMARY

In view of the technical problems discussed above, systems and methods are described herein for novel approaches and/or improvements to real-time data processing of unstructured data. In particular, the systems and methods describe real-time data processing of unstructured data without interstitial standardization. For example, the systems and methods describe real-time data processing of unstructured data in which both the input and the output to the data processing pipeline is unstructured data. Moreover, the systems and methods allow for the processing, analysis, and/or retrieval of the unstructured data while the data is in its unstructured form.

More specifically, the systems and methods allow for real-time, user-specific notifications of received data. For example, the system may receive unstructured data and, without standardizing the unstructured data into structured data, the system may determine content (e.g., keywords, recipients, urgency levels, dependent tasks, etc.) of the unstructured data. The system may then allow for processing, analysis, and/or retrieval of the unstructured data along with annotations based on the determined content. For example, upon the system receiving unstructured data, the system may determine a recipient of the unstructured data. The system may generate for display on a user interface content of the unstructured data as well as content related to one or more preconditions and/or dependencies for the unstructured data.

To achieve this, the system receives unstructured data and segregates the unstructured data into a series of unstructured dataset components. The system then determines the relationships (e.g., primary and foreign keys, graph relationships, hierarchical relationships, temporal relationships, semantic relationships, etc.), if any, between different unstructured dataset components in the unstructured data. These relationships may comprise preconditions and dependencies for data in the unstructured dataset components as well as information about the content of each unstructured dataset component. Additionally, the system may determine any content, if detectable, in the unstructured dataset and/or provide a direct link to that native unstructured data. The system may then vectorize the unstructured data, the relationships, and any determined content therein. The vectorized data may now be utilized for further processing (e.g., responding to user requests), further analysis (e.g., training artificial intelligence models to determine relationships), and/or retrieval (e.g., accessing the content of unstructured data in a native format). By doing so, the system may detect and/or store information about the relationships as well as all retrieved native unstructured data for presentation in response to a user request.

It should be further noted that in some embodiments, the systems and methods may train one or more artificial intelligence models. Artificial intelligence, including, but not limited to, machine learning, deep learning, etc. (referred to collectively herein as artificial intelligence models, machine learning models, or simply models) refers to a wide-ranging branch of computer science concerned with building smart machines capable of performing tasks that typically require human intelligence. Key benefits of artificial intelligence are its ability to process data, find underlying patterns, and/or perform real-time determinations based on the vectorized data.

In some aspects, systems and methods for providing real-time, user-specific notifications of unstructured data are described. For example, the system may receive a first native unstructured dataset. The system may determine a first native unstructured dataset component in the first native unstructured dataset. The system may generate a first vector representation of the first native unstructured dataset component. The system may generate a vector database comprising the first vector representation. The system may generate a first pointer to the first native unstructured dataset component in the first native unstructured dataset. The system may process the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets. The system may process the vector database to determine, using a second artificial intelligence model, first content for the first native unstructured dataset component, wherein the second artificial intelligence model uses natural language processing to determine the first content. The system may determine a user and an urgency of a first notification corresponding to the first native unstructured dataset based on the first content. The system may generate for display, on a user interface, a first notification based on the user and the urgency, wherein the first notification is populated based on retrieving the first native unstructured dataset component using the first pointer and retrieving the third native unstructured dataset component based on the first dependency.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
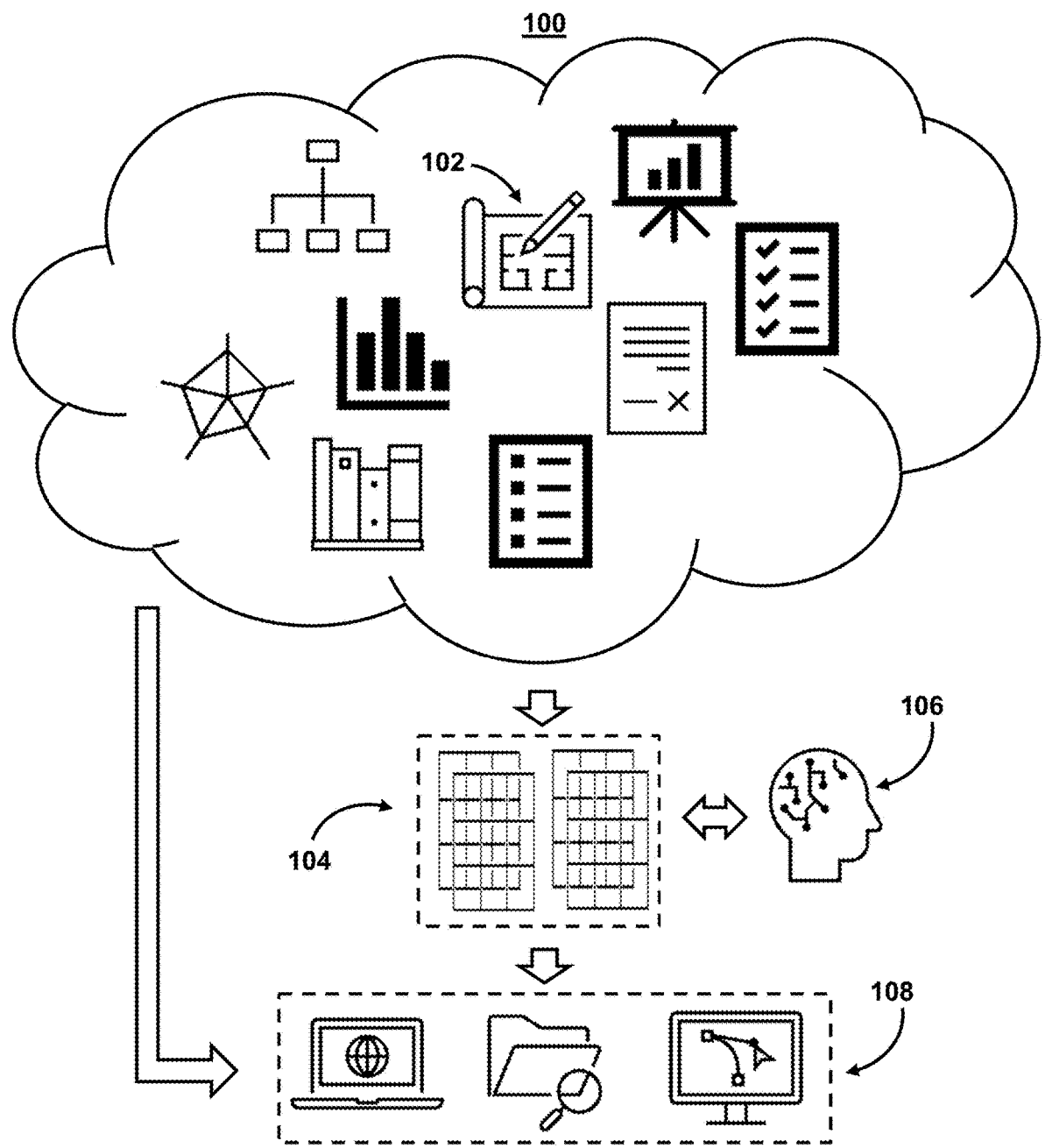
FIG. 1 shows an illustrative diagram providing real-time, user-specific notifications of unstructured data, in accordance with one or more embodiments.

FIG. 1 shows an illustrative diagram providing real-time, user-specific notifications of unstructured data, in accordance with one or more embodiments. For example, system 100 may comprise a system for providing real-time, user-specific notifications of unstructured data by processing the unstructured data without interstitial standardization. For example, a conventional system may first need to standardize unstructured data (e.g., format the data into structured data of a particular type) according to a given data model (e.g., a relational data model, entity-relationship data model, object-oriented data model, etc.).

As described herein, unstructured data may refer to information that does not have a predefined data model and/or is not organized in a predefined manner. This type of data lacks a specific structure or format, making it more challenging to organize, analyze, and process compared to structured data. Additionally, unstructured data does not fit neatly into traditional databases or spreadsheets because it does not follow a consistent structure. Analyzing unstructured data often requires specialized tools such as natural language processing (NLP), machine learning algorithms, or data mining techniques to extract valuable insights and patterns from the information. For example, a data model for structured data is a blueprint or framework that defines the structure, organization, relationships, and constraints within a database. It establishes rules and standards for how data is stored, accessed, and managed within a system. Structured data models ensure data consistency, integrity, and efficient querying.

The systems and methods described herein may provide real-time, user-specific notifications of unstructured data. Real-time data (or near real-time data) may refer to information that is delivered or processed immediately after it is generated, enabling users to access or analyze it instantly as it becomes available. This type of data is time-sensitive and reflects the most current state or situation at any given moment. Real-time data may be defined by characteristics such as immediacy (e.g., real-time data is available for use or analysis as soon as it is generated or received), low latency (e.g., there is minimal delay between data generation and accessibility), continuous updates (e.g., it is constantly changing and updated frequently, reflecting the latest information), time relevance (e.g., the value of real-time data diminishes with time as newer information becomes available), etc. The systems and methods may determine identifiers of these characteristics and/or process data based on these identifiers to determine recipients (e.g., users), urgency levels, and/or senders (e.g., sources).

Examples of real-time data sources include financial markets (e.g., stock prices, currency exchange rates, and market trends), IoT (Internet of Things) devices (e.g., sensors collecting real-time data on temperature, humidity, motion, etc.), social media feeds (e.g., immediate updates on posts, tweets, or interactions), traffic monitoring systems (e.g., data on traffic flow, congestion, and accidents updated in real-time), online gaming (e.g., gaming environments where actions and events occur instantly).

System 100 may process unstructured data (e.g., unstructured data 102) to generate real-time notifications. A real-time notification may be an instant alert or message that is sent or displayed to a user or system as soon as a specific event or trigger occurs. These notifications are delivered without any significant delay, providing timely information or updates based on real-time data.

Unstructured data 102 may then be processed by system 100 to generate a vector representation of the unstructured data. A vector representation of unstructured data involves transforming unstructured data, such as text or images, into a vector format. This process converts the raw unstructured data into a set of numbers arranged in the vector format, where each dimension or element of the vector represents a particular aspect or feature of the original data. Notably, the vector format does not require any interstitial standardization.

As shown in FIG. 1, system 100 may process unstructured data 102 into a vector format (e.g., vector format 104). A vector format refers to a way of representing graphical, textual, audio, or spatial information using vectors. In this context, vectors denote geometric primitives such as points, lines, curves, and shapes defined by mathematical equations rather than pixels or individual dots as seen in raster graphics (bitmap images). System 100 may convert the raw unstructured data into a set of numbers arranged in a vector format, where each dimension or element of the vector represents a particular aspect or feature of the original data.

To generate vector format 104, system 100 may use one or more models (e.g., model 106), which may be an artificial intelligence model. For example, model 106 may use a Bag-of-Words (BoW) approach. Used for text data, this technique represents each document as a vector where each element corresponds to the frequency of a word in the document. The order of words is disregarded, and the vectors capture the presence or absence of words in the document. Additionally or alternatively, model 106 may use TF-IDF (Term Frequency-Inverse Document Frequency). Similar to BoW, TF-IDF represents text data by considering the frequency of words in a document but also adjusts the importance of words by considering their frequency across all documents in a corpus. Additionally or alternatively, model 106 may use techniques like Word2Vec, GloVe, or FastText to represent words as dense vectors in a continuous vector space. These embeddings capture semantic relationships between words and can be used to represent entire documents by aggregating word embeddings. Additionally or alternatively, model 106 may use image extraction. For images, techniques like Convolutional Neural Networks (CNNs) are used to extract features. The final layers or intermediate layers of these networks can be used to create vector representations for images where each element represents different visual features. Additionally or alternatively, model 106 may use sequence-to-sequence models. Models like Recurrent Neural Networks (RNNs) or Transformers can generate vector representations for sequences of data (e.g., sentences, paragraphs) by considering the sequential relationships between words or tokens.

Vector representations allows system 100 to process and analyze unstructured data. For example, unstructured data may be processed and analyzed using machine learning algorithms that typically require structured numerical input. These representations capture essential characteristics or features of the original unstructured data, enabling tasks such as classification, clustering, recommendation, and information retrieval.

System 100 may then store the vector representations in vector database 108. As described herein, a vector database may refer to a type of database specifically optimized for handling and storing vector data efficiently. Vector databases are designed to manage and query large-scale vector datasets, particularly geographic information system (GIS) data, spatial data, or data with geometric representations.

In some embodiments, vector database 108 may perform one or more additional processing steps specific to the vector representations. For example, vector database 108 may perform spatial indexing (e.g., efficient indexing techniques to speed up spatial queries and retrievals of spatial objects based on their geometric properties), spatial operations (e.g., capabilities for performing geometric and spatial operations such as intersection, buffering, union, and proximity analysis), and/or optimized storage (e.g., techniques to minimize storage requirements for vector data while ensuring quick access and retrieval). Notably, vector database 108 may handle large volumes of vector data and perform operations efficiently even as the database grows.

System 100 may then perform one or more processing actions on vector database 108. As described herein, processing actions may refer to various operations or actions performed on the vector data stored within the database. These actions involve manipulating, analyzing, querying, and retrieving textual, spatial, and/or geometric information efficiently. Processing actions enable users to derive insights, perform spatial analyses, and extract meaningful information from the vector representations in vector database 108.

In some embodiments, system 100 may perform a spatial query. These involve retrieving spatial data based on their geometric relationships, such as searching for points within a certain area, finding polygons intersecting or containing other geometries, or locating nearest neighbors. Additionally or alternatively, system 100 may perform geometric operations. Actions like buffering (creating a zone around a feature), union, intersection, difference, and overlay operations (e.g., union, intersection) enable combining or modifying spatial objects based on their geometric properties. Additionally or alternatively, system 100 may perform spatial joins (e.g., combining data from different spatial datasets based on their spatial relationships, such as joining points to polygons that contain them or finding intersections between different layers). Additionally or alternatively, system 100 may perform index-based retrieval (e.g., using spatial indexes (like R-trees, grids, or other spatial data structures) to accelerate the retrieval of spatial data by narrowing down the search space and optimizing query performance). Additionally or alternatively, system 100 may perform geospatial analysis (e.g., performing analyses that involve spatial relationships and patterns, such as density analysis, proximity analysis, clustering, network analysis, and spatial statistics). Additionally or alternatively, system 100 may perform data aggregation and summarization (e.g., aggregating spatial data to higher levels of granularity, summarizing information within spatial boundaries, calculating statistics, or generating summary reports based on spatial features). Additionally or alternatively, system 100 may perform geocoding and/or reviser geocoding (e.g., translating addresses or descriptive locations into geographic coordinates (geocoding) or converting coordinates into a human-readable address (reverse geocoding)).

In some embodiments, processing actions in a vector database may be performed using specialized functions, libraries, or SQL extensions designed to handle spatial data efficiently. Functions, libraries, and SQL extensions tailored for working with spatial data in a vector database provide tools and capabilities to manipulate, analyze, query, and manage geometric or spatial information efficiently. PostGIS is a popular extension for PostgreSQL that adds support for geographic objects, spatial indexes, and functions. It provides a wide range of functions for spatial operations, such as geometric functions (e.g., ST_Intersection, ST_Buffer), spatial joins, distance calculations, and topological queries. Microsoft SQL Server includes spatial data types and functions for managing and analyzing spatial data. It provides functions for geometric operations, spatial indexes, and spatial queries (e.g., STIntersects, STBuffer). These libraries, extensions, and tools provide a rich set of functionalities to handle spatial data within databases or during data processing workflows. They allow users to perform various spatial operations, including geometric manipulations, spatial queries, geocoding, visualization, and more, depending on the specific requirements of their applications.

Figure 2:
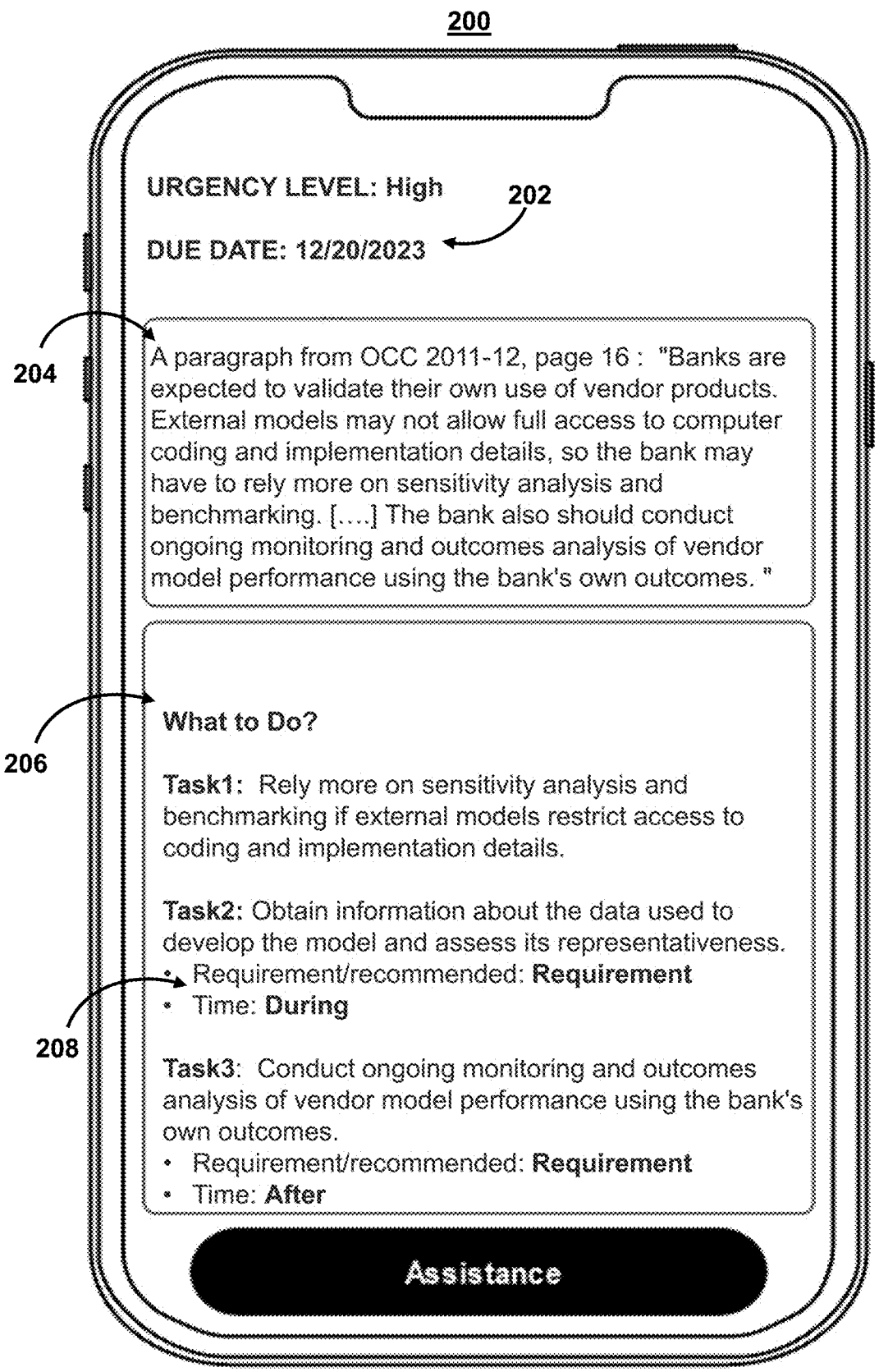
FIG. 2 shows an illustrative user interface featuring a real-time notification, in accordance with one or more embodiments.

FIG. 2 shows an illustrative user interface featuring a real-time notification, in accordance with one or more embodiments. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

User interface 200 may provide a notification comprising content determined based on vector representation of unstructured data. For example, user interface 200 includes temporal identifier 202. Temporal identifiers, in the context of databases and data management, are elements used to represent or identify time-related information within a dataset. These identifiers help in organizing, referencing, or querying data based on temporal attributes or timestamps associated with the data. Temporal identifiers may comprise timestamps. A timestamp is a precise point in time, often represented with date and time information. It indicates when a particular event occurred, a record was created or modified, or a measurement was taken. Timestamps can be in various formats, including ISO 8601 (e.g., "YYYY-MM-DD HH:MM:SS") or UNIX time (epoch time representing seconds elapsed since Jan. 1, 1970). Temporal identifiers may comprise temporal keys. Temporal keys are unique identifiers that combine temporal information, such as dates or times, with other attributes to create a key that uniquely identifies a record within a certain time period. For instance, a combination of a date and a user ID might serve as a temporal key in a dataset capturing daily user activities. Temporal identifiers may comprise temporal data types. For example, some databases or systems offer specific data types to store temporal information, allowing for efficient storage and querying of time-related data. For example, SQL databases may include temporal data types like DATE, TIME, DATETIME, TIMESTAMP, etc., to handle temporal information.

Temporal identifiers may allow the system to manage temporal data, allowing databases and systems to handle time-related queries efficiently. The system may facilitate operations like retrieving data within specific time ranges, analyzing trends over time, ensuring data consistency, and performing temporal joins or aggregations across datasets based on temporal attributes.

User interface 200 also includes native unstructured dataset component 204. For example, the system may receive unstructured datasets (e.g., unstructured data 102 (FIG. 1)). The system may then determine native unstructured dataset components in the unstructured datasets. In unstructured datasets, native components may refer to the fundamental elements or building blocks inherent within the unstructured data. These components can vary depending on the type of unstructured data, such as text, images, audio, video, or a combination of different data types. For textual unstructured data, components may comprise tokens (e.g., basic units of text, which could be words, phrases, or sentences, obtained through tokenization), entities (e.g., named entities such as names of people, organizations, locations, dates, or other specific entities identified through named entity recognition (NER)), parts-of-speech (e.g., grammatical components like nouns, verbs, adjectives, etc., determined through part-of-speech tagging), sentences and paragraphs (e.g., segments of text that convey meaningful information, used for understanding context and structure). For image unstructured data, components may comprise pixels (e.g., basic units of an image that form the visual elements, colors, and textures), features (e.g., extracted components from images such as edges, shapes, textures, colors, or more abstract features learned by deep learning models), objects and regions (e.g., identified objects, regions, or segments within an image, often categorized or labeled). For audio/video unstructured data, components may comprise frames (e.g., individual images that compose a video), temporal components (e.g., temporal relationships between frames, motion information, or changes over time within the video), audio features (e.g., extracted components representing aspects of sound, such as MFCCs (Mel-Frequency Cepstral Coefficients), spectrograms, or other audio features), speech segments (e.g., identified segments of speech or spoken words within audio data). For video unstructured data, components may comprise text-image pairings (e.g., relationships or associations between textual descriptions and corresponding images) and/or audio-visual links (e.g., connections between audio content and visual elements within a video).

In some embodiments, determining native components within unstructured datasets may be performed by the system using various techniques from NLP, computer vision, and other data processing methodologies. To generate the native unstructured dataset components, the system may use tokenization (e.g., breaking down the text into individual tokens, which could be words, phrases, or sentences), part-of-speech tagging (e.g., identifying the grammatical parts of each token (e.g., nouns, verbs, adjectives) to understand the structure of sentences), named entity recognition (e.g., recognizing and categorizing named entities such as names of people, organizations, locations, dates, etc., within the text), dependency parsing (e.g., analyzing the grammatical structure to identify relationships between words, phrases, or entities in a sentence), topic modeling (e.g., identifying latent topics or themes within the text, grouping similar content together based on their semantic similarities).

In some embodiments, the system may process the vector database to determine, using a second artificial intelligence model, first content for the first native unstructured dataset component, wherein the second artificial intelligence model uses NLP to determine the first content. For example, the system may process vector representation in the vector database to determine the content of native unstructured dataset component 204.

In the context of native components within unstructured datasets, the content may refer to the substantive information or the main body of data contained within the dataset. The content may represent the actual meaningful information present in the unstructured data, whether it is text, images, audio, or other forms of data. In textual data, the content may refer to the actual words, sentences, paragraphs, or documents that convey information, ideas, or messages.

It may encompass the meaningful text excluding structural elements like metadata, formatting, or markup language. In images, content may denote the visual information present within the image, including objects, scenes, textures, colors, patterns, shapes, etc. It represents the actual visual elements captured in the image. For audio data, content may refer to the actual sounds, spoken words, music, or other auditory information present in the audio recording. For example, the system may determine the content of native unstructured dataset component 204 in order to populate a notification.

In some embodiments, the system may determine a task based on content. For example, a task may refer to a specific action, operation, and/or set of instructions that a computer system is assigned to perform to achieve a particular objective. In some embodiments, the system may prefetch other content (e.g., from other native unstructured dataset components) based on a task. For example, the system may determine one or more tasks (e.g., task 206) as well as content related to that task (e.g., content 208).

In some embodiments, the system may process the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets. For example, the system may determine dependencies and preconditions. Dependencies and preconditions may describe relationships between different tasks, activities, and/or conditions that must be met for successful execution or completion of a process. For example, dependencies may refer to the relationships or connections between different tasks, activities, or components within a project or system. These relationships define the order or constraints that govern the execution sequence or timing of these elements. Dependencies may include Finish-to-Start (FS) tasks (e.g., the dependent task cannot start until the task it depends on is finished), Start-to-Start (SS) tasks (e.g., the dependent task cannot start until the task it depends on starts), Finish-to-Finish (FF) tasks, (e.g., the dependent task cannot finish until the task it depends on is finished), and Start-to-Finish (SF) tasks (e.g., the dependent task cannot finish until the task it depends on starts).

Preconditions are the necessary conditions, requirements, and/or criteria that must be fulfilled or met before a particular task, action, or process can begin or be successfully executed. These conditions create the necessary environment or context for the subsequent task to proceed. Preconditions might include having the necessary hardware, operating system compatibility, and available disk space before starting the installation process. Preconditions might involve securing required resources, obtaining necessary approvals, or completing prerequisite tasks before starting a project phase.

Figure 3A:
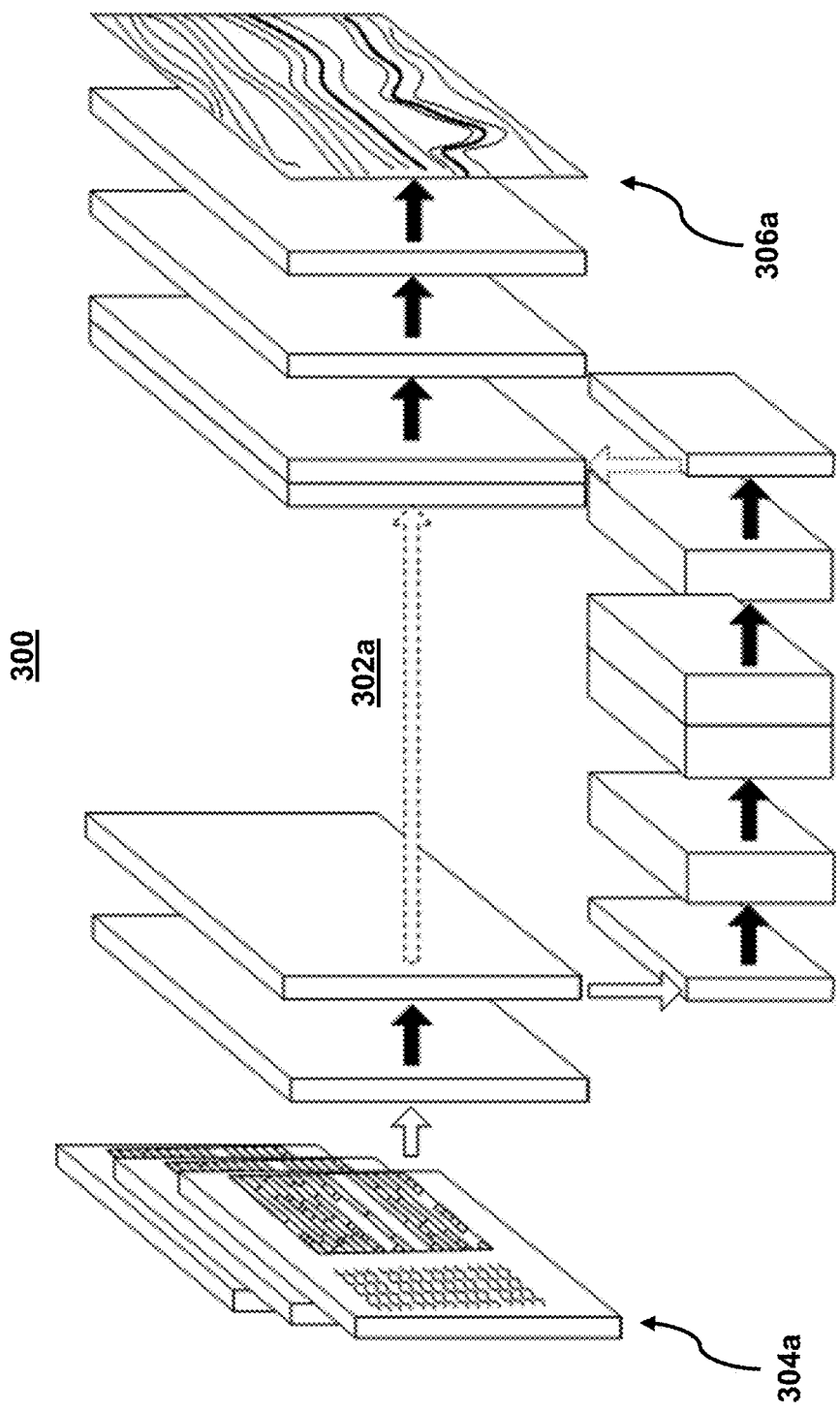
FIGS. 3A-B show illustrative components for a system used to provide real-time, user-specific notifications of unstructured data, in accordance with one or more embodiments.
Figure 3B:
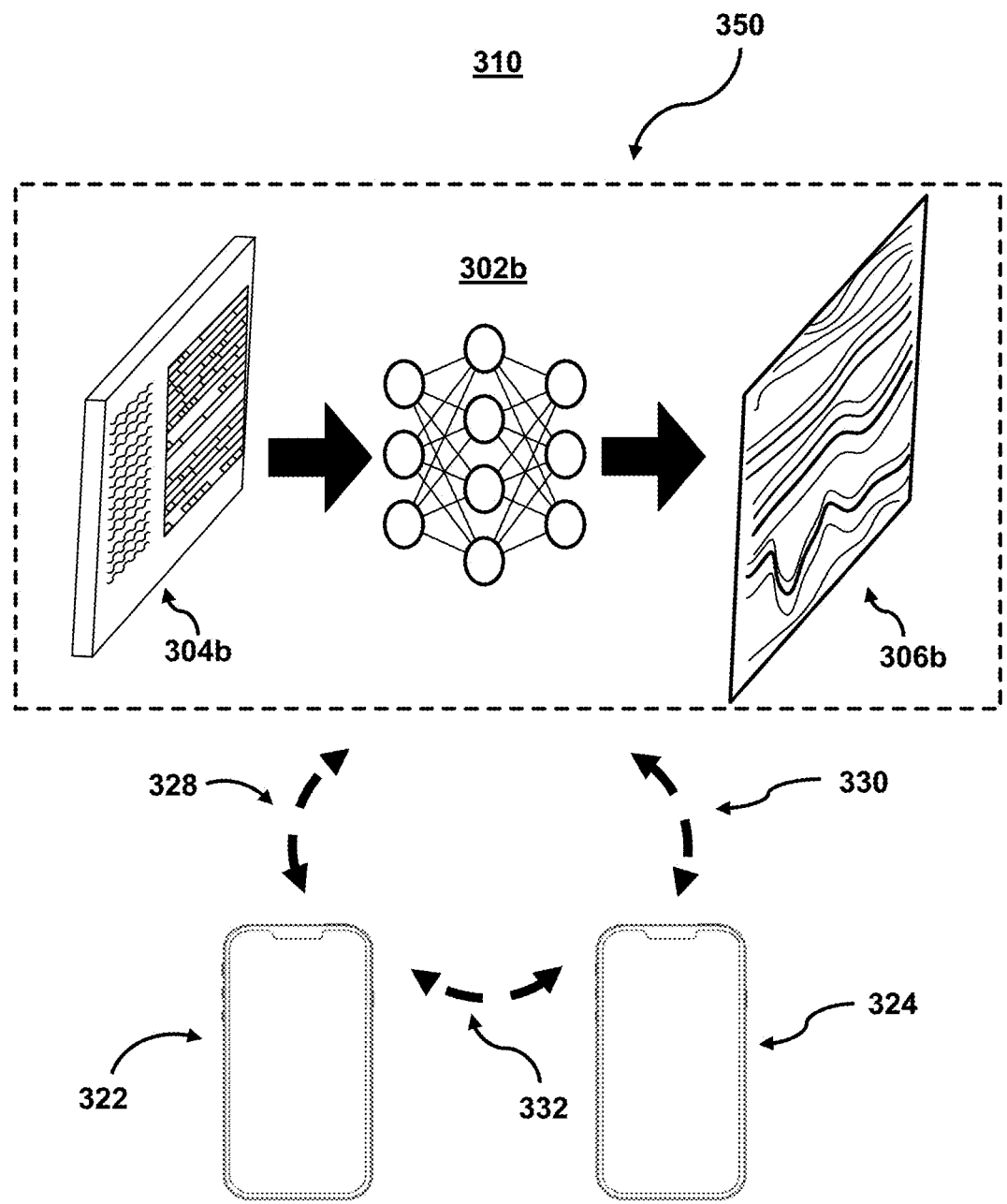

FIGS. 3A-B show illustrative components for a system used to provide real-time, user-specific notifications of unstructured data, in accordance with one or more embodiments. For example, FIG. 3A may represent a model architecture used to determine content, dependencies, relationships, etc.

For example, the system may train a model to determine dependencies (or relationships, content, tasks, preconditions, etc.) between native unstructured datasets based on historic vector representations that involve several steps, leveraging machine learning techniques and historical data to establish relationships among these datasets. To do so, the system may gather historical unstructured datasets that are relevant to the analysis. These datasets could include text documents, images, audio files, or any other forms of unstructured data. The system may use methods such as word embeddings (for text), CNNs (for images), or audio feature extraction techniques to convert the unstructured data into vector representations. Each dataset should be represented as vectors in a numerical format. The system may define or annotate the historical datasets with labels or indicators that signify dependencies or relationships between these datasets. For example, if one text document is related to or dependent on another, the system may create labels to represent these dependencies. The system may then use the trained model to predict dependencies or relationships between new or unseen datasets. To do so, the system may receive an input of the vector representations of the new datasets into the model, and it should predict the likelihood or strength of dependencies between them based on the learned patterns from historical data. The system may validate the model's predictions against ground truth or known dependencies to assess its accuracy and refine the model if necessary. By doing so, the system leverages historical vector representations of unstructured datasets to train a model capable of inferring dependencies between such datasets. The success of the model relies on the quality of the historical data, the effectiveness of feature extraction methods, and the chosen machine learning architecture's ability to capture complex relationships.

System 300 includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., determine content, dependencies, relationships, etc.).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to determine content, dependencies, relationships, etc.

FIG. 3B shows illustrative components for a system used to provide real-time, user-specific notifications of unstructured data. For example, FIG. 3B may show illustrative components for providing real-time, user-specific notifications of unstructured data by processing the unstructured data without interstitial standardization in accordance with one or more embodiments. As shown in FIG. 3B, system 310 may include mobile device 322 and mobile device 324. While shown as smartphones, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free flowing, with connections interacting in a more chaotic and complex fashion. During testing, an output layer of model 302b may indicate whether or not a given input corresponds to a classification of model 302b (e.g., determined content, dependencies, relationships, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
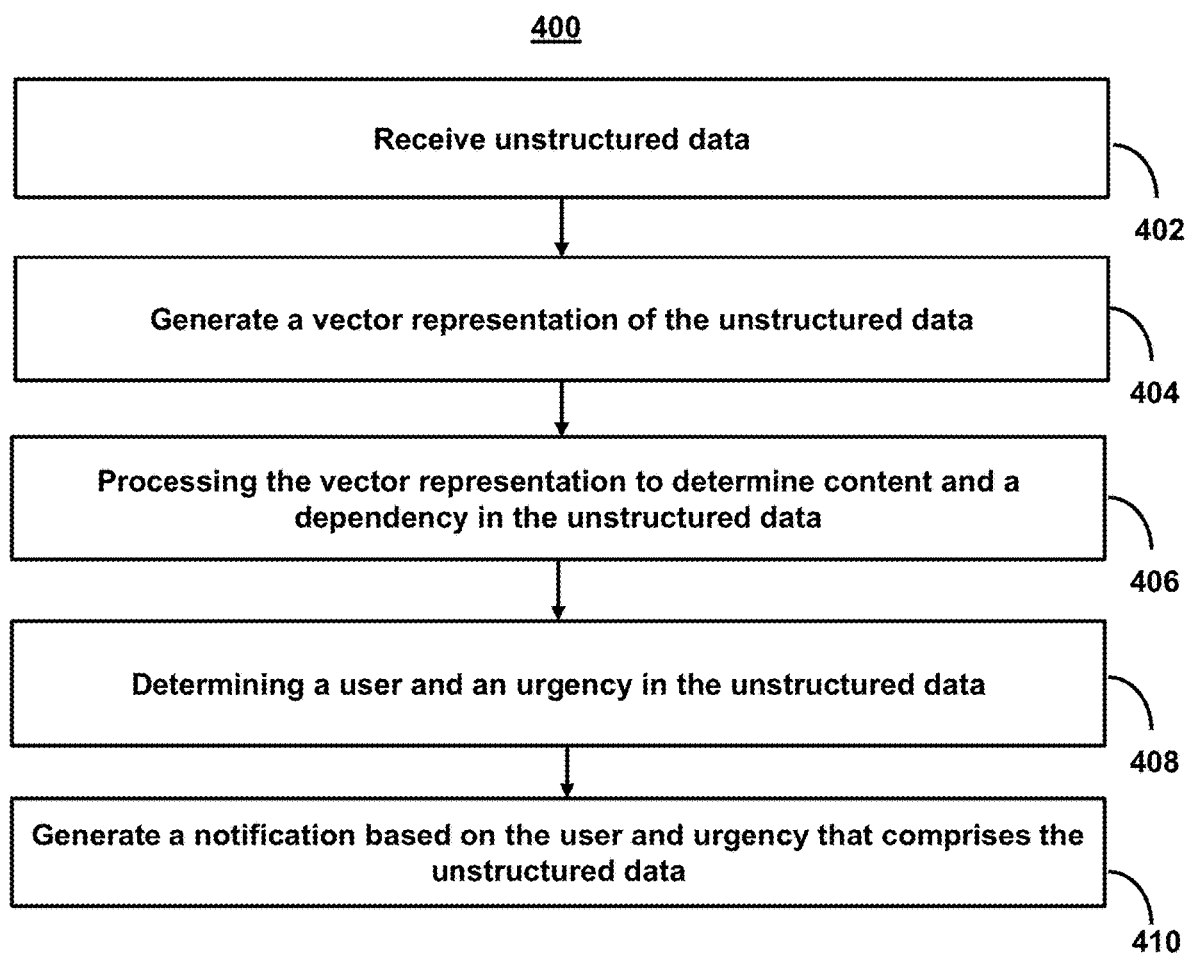
FIG. 4 shows a flowchart of the steps involved in providing real-time, user-specific notifications of unstructured data, in accordance with one or more embodiments.

FIG. 4 shows a flowchart of the steps involved in providing real-time, user-specific notifications of unstructured data, in accordance with one or more embodiments. For example, the system may use process 400 (e.g., as implemented on one or more system components described above) in order to process unstructured data as well as generate outputs.

At step 402, process 400 (e.g., using one or more components described above) receives unstructured data. For example, the system may receive a first native unstructured dataset. Unstructured data, such as social media feeds, sensor data, or live video streams, may be received through streaming services. Computers can connect to these streams via APIs, protocols (like HTTP, WebSockets), or dedicated interfaces to continuously receive and process the data in real-time. In some embodiments, the system may fetch unstructured data from websites or online sources using web scraping techniques. Web scraping involves extracting data from web pages directly by parsing HTML content or utilizing APIs provided by websites to retrieve unstructured information.

The system may also determine a first native unstructured dataset component in the first native unstructured dataset. For example, the system may determine the first native unstructured dataset component in the first native unstructured dataset by determining a first token in the first native unstructured dataset. The system may partition the first token into the first native unstructured dataset component.

At step 404, process 400 (e.g., using one or more components described above) generates a vector representation of the unstructured data. For example, the system may generate a first vector representation of the first native unstructured dataset component. In some embodiments, the system may determine mapping the first vector representation to a first word in the first native unstructured dataset component. The system may update the first pointer based on the mapping.

The system may also generate a vector database comprising the first vector representation. The vector database may comprise a plurality of different vector representations. For example, the system may determine a second native unstructured dataset component in the first native unstructured dataset. The system may generate a second vector representation of the second native unstructured dataset component. The system may store the second vector representation in the vector database.

The system may generate a first pointer to the first native unstructured dataset component in the first native unstructured dataset. In some embodiments, retrieving the first native unstructured dataset component using the first pointer may comprise the system determining a first location of the first native unstructured dataset component in the first native unstructured dataset based on the first pointer. For example, the system may determine the structure and format of the pointer, which may memory addresses, references, indices, or metadata containing information to locate the native unstructured dataset component. In some embodiments, the pointers indicate the starting position or offset within the document.

The system may determine a first dimension of the first native unstructured dataset component based on the first pointer. For example, the system may use the decoded pointer information to access the dataset or the location indicated by the pointer. In some embodiments, the system may determine the data type or structure at the indicated location. For instance, in a text document, the pointer might refer to a specific paragraph, sentence, dimension, and/or character position.

The system may then populate a template for the first notification based on the first location and the first dimension. For example, the system may populate a notification template based on the first location, and the first dimension may involve utilizing the extracted information from the dataset to structure the notification content according to a predefined template.

At step 406, process 400 (e.g., using one or more components described above) processes the vector representation to determine content and a dependency in the unstructured data. For example, the system may process the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets. For example, the system may evaluate the nature of the content associated with the notification. This might involve NLP techniques for text analysis, image recognition for visual content, or other methods depending on the type of content.

In some embodiments, retrieving the third native unstructured dataset component based on the first dependency may comprise the system determining a second pointer to the third native unstructured dataset component in the second native unstructured dataset. The system may determine a second location of the third native unstructured dataset component in the second native unstructured dataset based on the second pointer. The system may determine a second dimension of the third native unstructured dataset component based on the second pointer.

In some embodiments, the system may determine a relationship between native unstructured dataset components. For example, the system may determine a first relationship between the first native unstructured dataset component and the second native unstructured dataset component in the first native unstructured dataset, using a third artificial intelligence model, wherein the third artificial intelligence model is trained to determine relationships between native content in unstructured datasets based on historic relationships in historic unstructured content. The system may determine a third vector representation of the first relationship. The system may store the third vector representation in the vector database.

The system may also process the vector database to determine, using a second artificial intelligence model, first content for the first native unstructured dataset component, wherein the second artificial intelligence model uses NLP to determine the first content. The system may determine the context of the content.

In some embodiments, processing the vector database to determine the first dependency of the first native unstructured dataset component may comprise the system determining a first task in the first native unstructured dataset component. The system may determine a first task lineage for the first task. The system may determine a second task based on the first task lineage. For example, the task lineage refers to the chronological record or trace of tasks or operations performed within a system or a data processing pipeline. It involves capturing and documenting the entire sequence of tasks, transformations, processes, or operations applied to data from its origin to its final state. In some embodiments, the system may determine a first pattern in vector representations. The system may determine the first task lineage based on the first pattern. Additionally or alternatively, the system may determine a first pattern in the vector database. The system may determine the first pattern comprises the first vector representation and a fourth vector representation, wherein the fourth vector representation corresponds to the third native unstructured dataset component. For example, the system may retrieve the first vector representation from the vector database. The system may input the first vector representation and the first dependency into the second artificial intelligence model.

At step 408, process 400 (e.g., using one or more components described above) determines a user and an urgency in the unstructured data. For example, the system may determine an urgency of the first notification based on a first temporal identifier in the first content. The system may determine the urgency of a notification, based on the first temporal identifier and content, involves analyzing the timestamp and the nature of the content to assess the priority or immediacy of the notification. To do so, the first temporal identifier, which could be a timestamp, date, or time associated with the notification, is extracted and analyzed by the system. The system may interpret the timestamp to determine when the notification was generated or received. This could involve converting it into a standardized format, such as UTC, and calculating the time difference from the current time. In some embodiments, the system may determine the urgency of the first notification. For example, the system may detect a first object (e.g., an alphanumeric character) in the first content. The system may then compare the first object to a listing of temporal identifiers. The system may then determine a first temporal identifier in the first content based on comparing the first object to the listing of temporal identifiers. The system may determine the urgency for transmitting the first notification based on the first temporal identifier.

Some notifications might contain critical information, urgency markers (like keywords, phrases, urgency indicators), or content that inherently implies urgency (e.g., emergency alerts, time-sensitive messages). The system may establish rules or algorithms that prioritize notifications based on temporal identifiers and content characteristics. For instance, notifications with timestamps indicating imminent events or containing urgent keywords might be flagged as high priority. Based on the assessment of urgency, the system may prioritize and display notifications accordingly. Urgent notifications may be highlighted or brought to the user's attention more prominently (e.g., as shown in FIG. 2).

The system may also determine a user of the first notification based on a first user identifier in the first content. For example, the system may determine the user associated with the first notification based on a user identifier within the content involves several steps, especially in systems where notifications carry user-specific information. The system may extract the first notification's content to identify and isolate the user identifier. This could be a username, user ID, email address, or any unique identifier associated with a user in the system. The system may determine the format or structure of the content to accurately locate and extract the user identifier. This might involve regular expressions, pattern matching, or specific parsing techniques based on the content format. The system may check against the system's user database or user records to verify the extracted user identifier. The system may then match the identifier with existing user profiles or records to confirm the user's identity. Once the user identifier is confirmed, the system may map it to the corresponding user profile or user account within the system. The system may route the notification to the identified user's designated communication channel or endpoint (e.g., email, mobile app, messaging platform) based on the users preferences or predefined notification settings.

For example, determining the user of the first notification may comprise the system detecting a first object in the first content. The system may compare the first object to a listing of user identifiers. The system may determine a first user identifier in the first content based on comparing the first object to the listing of user identifiers. The system may determine the user for the first notification based on the first user identifier.

At step 410, process 400 (e.g., using one or more components described above) generates a notification based on the user and urgency that comprises the unstructured data. For example, the system may generate for display, on a user interface, a first notification based on the user and the urgency, wherein the first notification is populated based on retrieving the first native unstructured dataset component using the first pointer and retrieving the third native unstructured dataset component based on the first dependency.

In some embodiments, the system may generate a notification based on user-specific information, urgency, and unstructured data. For example, the system may retrieve the user's profile or relevant information from the system's database or user management system. This information may include contact details, preferences, notification settings, and any other relevant data associated with the user. The system may assess the urgency level for the notification based on predefined criteria, urgency markers within the data, or machine learning models analyzing historical patterns or content characteristics. The system may parse and analyze the unstructured data associated with the notification. This step could involve NLP, image analysis, audio processing, or any relevant techniques based on the type of unstructured data. The system may prepare the content of the notification, which may include summarization, key points extraction, or formatting of the unstructured data into a suitable format for notification delivery. The system may combine user-specific information, urgency level, and processed unstructured data to create the notification message. This might involve formatting the message, including relevant details, and ensuring clarity and relevance. In some embodiments, the system may route the generated notification to the user's preferred communication channel or endpoint based on his or her profile settings (e.g., mobile app, email, SMS, push notification) and/or ensure optimal delivery timing based on urgency (e.g., higher urgency notifications might bypass queuing systems for immediate delivery).

In some embodiments, the system may use a generative artificial intelligence model to generate the notification. For example, generative models, particularly in the realm of NLP, use various techniques to determine content for native unstructured dataset components. Generative models, like Recurrent Neural Networks (RNNs), Long Short-Term Memory networks (LSTMs), or Transformers (such as GPT models), are trained on vast amounts of text data. These models learn the underlying patterns, structures, and relationships within the data. Generative models create a probability distribution over the possible sequences of tokens (words, characters, etc.) in the training data. This allows them to generate new content by sampling from this learned distribution. When tasked with generating content for a native unstructured dataset component, the generative model starts by taking an initial prompt or seed input. This could be a sentence, a few words, or even just a token. The model then generates subsequent tokens based on the learned patterns, predicting the most probable next token given the context provided. Models like GPT (Generative Pre-trained Transformer) operate in an autoregressive manner, where they generate one token at a time, considering the previously generated tokens as context. This iterative process continues until the desired length of content is generated or a stopping criterion is reached. Generative models are designed to capture context from the input data. They utilize attention mechanisms or other techniques to understand dependencies and relationships between words or tokens in the text, enabling them to generate coherent and contextually relevant content. Generative models can also be fine-tuned on specific datasets to adapt to the characteristics and nuances of the data domain. Fine-tuning involves additional training on a smaller, domain-specific dataset to improve performance on a particular task or dataset. Generated content is evaluated based on metrics such as coherence, fluency, relevance, and diversity. Refinement of the model can occur based on this feedback to improve the quality of the generated output.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing real-time, user-specific notifications of unstructured data by processing the unstructured data without interstitial standardization.

2. The method of the preceding embodiment, further comprising: receiving a first native unstructured dataset; determining a first native unstructured dataset component in the first native unstructured dataset; generating a first vector representation of the first native unstructured dataset component; generating a vector database comprising the first vector representation; generating a first pointer to the first native unstructured dataset component in the first native unstructured dataset; processing the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets; processing the vector database to determine, using a second artificial intelligence model, first content for the first native unstructured dataset component, wherein the second artificial intelligence model uses natural language processing to determine the first content; determining a user and an urgency of a first notification corresponding to the first native unstructured dataset based on the first content; and generating for display, on a user interface, a first notification based on the user and the urgency, wherein the first notification is populated based on retrieving the first native unstructured dataset component using the first pointer and retrieving the third native unstructured dataset component based on the first dependency.

3. The method of any one of the preceding embodiments, wherein determining the urgency of the first notification further comprises: detecting a first object in the first content; comparing the first object to a listing of temporal identifiers; determining a first temporal identifier in the first content based on comparing the first object to the listing of temporal identifiers; and determining the urgency for transmitting the first notification based on the first temporal identifier.

4. The method of any one of the preceding embodiments, wherein determining the user of the first notification further comprises: detecting a first object in the first content; comparing the first object to a listing of user identifiers; determining a first user identifier in the first content based on comparing the first object to the listing of user identifiers; and determining the user for the first notification based on the first user identifier.

5. The method of any one of the preceding embodiments, further comprising: determining a first relationship between the first native unstructured dataset component and the second native unstructured dataset component in the first native unstructured dataset, using a third artificial intelligence model, wherein the third artificial intelligence model is trained to determine relationships between native content in unstructured datasets based on historic relationships in historic unstructured content; and determining a third vector representation of the first relationship; and storing the third vector representation in the vector database.

6. The method of any one of the preceding embodiments, further comprising: determining a second native unstructured dataset component in the first native unstructured dataset; generating a second vector representation of the second native unstructured dataset component; and storing the second vector representation in the vector database.

7. The method of any one of the preceding embodiments, wherein retrieving the first native unstructured dataset component using the first pointer further comprises: determining a first location of the first native unstructured dataset component in the first native unstructured dataset based on the first pointer; determining a first dimension of the first native unstructured dataset component based on the first pointer; and populating a template for the first notification based on the first location and the first dimension.

8. The method of any one of the preceding embodiments, wherein retrieving the third native unstructured dataset component based on the first dependency further comprises: determining a second pointer to the third native unstructured dataset component in the second native unstructured dataset; determining a second location of the third native unstructured dataset component in the second native unstructured dataset based on the second pointer; and determining a second dimension of the third native unstructured dataset component based on the second pointer.

9. The method of any one of the preceding embodiments, wherein processing the vector database to determine the first dependency of the first native unstructured dataset component further comprises: determining a first task in the first native unstructured dataset component; determining a first task lineage for the first task; and determining a second task based on the first task lineage.

10. The method of any one of the preceding embodiments, wherein processing the vector database to determine the first dependency of the first native unstructured dataset component further comprises: determining a first task in the first native unstructured dataset component; determining a first task lineage for the first task; and determining a second task based on the first task lineage.

11. The method of any one of the preceding embodiments, wherein processing the vector database to determine the first content for the first native unstructured dataset component further comprises: retrieving the first vector representation from the vector database; and inputting the first vector representation and the first dependency into the second artificial intelligence model.

12. The method of any one of the preceding embodiments, wherein processing the vector database to determine the first dependency of the first native unstructured dataset component further comprises: determining a first pattern in the vector database; and determining the first pattern comprises the first vector representation and a fourth vector representation, wherein the fourth vector representation corresponds to the third native unstructured dataset component.

13. The method of any one of the preceding embodiments, wherein generating a vector database further comprises: determining mapping the first vector representation to a first word in the first native unstructured dataset component; and updating the first pointer based on the mapping.

14. The method of any one of the preceding embodiments, wherein determining the first native unstructured dataset component in the first native unstructured dataset further comprises: determining a first token in the first native unstructured dataset; and partitioning the first token into the first native unstructured dataset component.

15. A tangible, non-transitory, computer-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for providing real-time, user-specific notifications of unstructured data by processing the unstructured data without interstitial standardization, the system comprising:
receiving a first native unstructured dataset;
determining a first native unstructured dataset component in the first native unstructured dataset;
generating a first vector representation of the first native unstructured dataset component;
generating a vector database comprising the first vector representation;
generating a first pointer to the first native unstructured dataset component in the first native unstructured dataset;
processing the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets; and processing the vector database to determine, using a second artificial intelligence model, first content for the first native unstructured dataset component, wherein the second artificial intelligence model uses natural language processing to determine the first content.

2. A method for providing real-time, user-specific notifications of unstructured data by processing the unstructured data without interstitial standardization, the method comprising:
receiving a vector database comprising a first vector representation based on a first native unstructured dataset component;
processing the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets;
processing the vector database to determine, using a second artificial intelligence model, first content for the first native unstructured dataset component, wherein the second artificial intelligence model uses natural language processing to determine the first content;
determining a user and an urgency of a first notification corresponding to the first native unstructured dataset based on the first content; and
generating for display, on a user interface, a first notification based on the user and the urgency, wherein the first notification is populated based on retrieving the first native unstructured dataset component and retrieving the third native unstructured dataset component based on the first dependency.

3. The method of claim 2, wherein determining the urgency of the first notification further comprises:
detecting a first object in the first content;
comparing the first object to a listing of temporal identifiers;
determining a first temporal identifier in the first content based on comparing the first object to the listing of temporal identifiers; and
determining the urgency for transmitting the first notification based on the first temporal identifier.

4. The method of claim 2, wherein determining the user of the first notification further comprises:
detecting a first object in the first content;
comparing the first object to a listing of user identifiers;
determining a first user identifier in the first content based on comparing the first object to the listing of user identifiers; and
determining the user for the first notification based on the first user identifier.

5. The method of claim 2, further comprising:
determining a first relationship between the first native unstructured dataset component and a second native unstructured dataset component in the first native unstructured dataset, using a third artificial intelligence model, wherein the third artificial intelligence model is trained to determine relationships between native content in unstructured datasets based on historic relationships in historic unstructured content;
determining a third vector representation of the first relationship; and
storing the third vector representation in the vector database.

6. The method of claim 2, further comprising:
determining a second native unstructured dataset component in the first native unstructured dataset;
generating a second vector representation of the second native unstructured dataset component; and
storing the second vector representation in the vector database.

7. The method of claim 2, wherein retrieving the first native unstructured dataset component further comprises:
determining a first location of the first native unstructured dataset component in the first native unstructured dataset based on a first pointer;
determining a first dimension of the first native unstructured dataset component based on the first pointer; and
populating a template for the first notification based on the first location and the first dimension.

8. The method of claim 2, wherein retrieving the third native unstructured dataset component based on the first dependency further comprises:
determining a second pointer to the third native unstructured dataset component in the second native unstructured dataset;
determining a second location of the third native unstructured dataset component in the second native unstructured dataset based on the second pointer; and
determining a second dimension of the third native unstructured dataset component based on the second pointer.

9. The method of claim 2, wherein processing the vector database to determine the first dependency of the first native unstructured dataset component further comprises:
determining a first task in the first native unstructured dataset component;
determining a first task lineage for the first task; and
determining a second task based on the first task lineage.

10. The method of claim 9, wherein processing the vector database to determine the first dependency of the first native unstructured dataset component further comprises:
determining a first pattern in vector representations; and
determining the first task lineage based on the first pattern.

11. The method of claim 2, wherein processing the vector database to determine the first content for the first native unstructured dataset component further comprises:
retrieving the first vector representation from the vector database; and
inputting the first vector representation and the first dependency into the second artificial intelligence model.

12. The method of claim 2, wherein processing the vector database to determine the first dependency of the first native unstructured dataset component further comprises:
determining a first pattern in the vector database; and
determining the first pattern comprises the first vector representation and a fourth vector representation, wherein the fourth vector representation corresponds to the third native unstructured dataset component.

13. The method of claim 2, wherein generating a vector database further comprises:
determining a mapping of the first vector representation to a first word in the first native unstructured dataset component; and
updating a first pointer based on the mapping.

14. The method of claim 2, wherein determining the first native unstructured dataset component further comprises:
determining a first token in a first native unstructured dataset; and partitioning the first token into the first native unstructured dataset component.

15. One or more non-transitory, computer-readable mediums, comprising instructions that, when executed by one or more processors, cause operations comprising:

accessing a vector database comprising a first vector representation based on a first native unstructured dataset component; processing the vector database to determine, using a first artificial intelligence model, a first dependency of the first native unstructured dataset component, wherein the first dependency comprises a third native unstructured dataset component in a second native unstructured dataset, and wherein the first artificial intelligence model is trained to determine dependencies between native unstructured datasets based on historic vector representations of historic unstructured datasets;

processing the vector database to determine, using a second artificial intelligence model, first content for the first native unstructured dataset component, wherein the second artificial intelligence model uses natural language processing to determine the first content; and determining a user and an urgency of a first notification corresponding to the first native unstructured dataset based on the first content.

16. The one or more non-transitory, computer-readable mediums of claim 15, wherein determining the urgency of the first notification further comprises:

detecting a first object in the first content;

comparing the first object to a listing of temporal identifiers;

determining a first temporal identifier in the first content based on comparing the first object to the listing of temporal identifiers; and determining the urgency for transmitting the first notification based on the first temporal identifier.

17. The one or more non-transitory, computer-readable mediums of claim 15, wherein determining the user of the first notification further comprises:

detecting a first object in the first content;

comparing the first object to a listing of user identifiers;

determining a first user identifier in the first content based on comparing the first object to the listing of user identifiers; and determining the user for the first notification based on the first user identifier.

18. The one or more non-transitory, computer-readable mediums of claim 15, further comprising:

determining a first relationship between the first native unstructured dataset component and a second native unstructured dataset component in a first native unstructured dataset, using a third artificial intelligence model, wherein the third artificial intelligence model is trained to determine relationships between native content in unstructured datasets based on historic relationships in historic unstructured content;

determining a third vector representation of the first relationship; and storing the third vector representation in the vector database.

19. The one or more non-transitory, computer-readable mediums of claim 15, further comprising:

determining a second native unstructured dataset component in the first native unstructured dataset;

generating a second vector representation of the second native unstructured dataset component; and storing the second vector representation in the vector database.

20. The one or more non-transitory, computer-readable mediums of claim 15, wherein retrieving the first native unstructured dataset component using a first pointer further comprises:

determining a first location of the first native unstructured dataset component in the first native unstructured dataset based on the first pointer;

determining a first dimension of the first native unstructured dataset component based on the first pointer; and populating a template for the first notification based on the first location and the first dimension.

* * * * *